(12) United States Patent
Wurtenberger et al.

(10) Patent No.: US 8,359,642 B1
(45) Date of Patent: Jan. 22, 2013

(54) RESTRICTING MATURE CONTENT

(75) Inventors: Andrew Mark Wurtenberger, Olathe, KS (US); Caleb Sisson Hyde, Kansas City, MO (US); Clark Douglas Halferty, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 308 days.

(21) Appl. No.: 12/823,435

(22) Filed: Jun. 25, 2010

(51) Int. Cl.
*G06F 21/00* (2006.01)
*G06F 15/16* (2006.01)
*H04L 9/32* (2006.01)

(52) U.S. Cl. ................... 726/7; 726/1; 709/206
(58) Field of Classification Search .................. 726/1, 7; 382/275; 715/752; 709/206; 455/466
See application file for complete search history.

(56) References Cited

U.S. PATENT DOCUMENTS

| | | | |
|---|---|---|---|
| 7,930,546 B2 * | 4/2011 | Rhoads et al. | 713/176 |
| 8,150,428 B2 * | 4/2012 | Kupsh et al. | 455/466 |
| 2007/0260603 A1 * | 11/2007 | Tuscano et al. | 707/9 |
| 2009/0123064 A1 * | 5/2009 | Gibbs | 382/165 |
| 2009/0163191 A1 | 6/2009 | Henderson | |
| 2009/0171915 A1 * | 7/2009 | Rothschild | 707/3 |
| 2009/0217149 A1 * | 8/2009 | Kamien et al. | 715/230 |
| 2009/0232413 A1 * | 9/2009 | Songhurst | 382/275 |
| 2009/0287655 A1 * | 11/2009 | Bennett | 707/3 |
| 2009/0307310 A1 * | 12/2009 | Kim et al. | 709/203 |
| 2010/0034470 A1 * | 2/2010 | Valencia-Campo et al. | 382/218 |
| 2010/0035639 A1 * | 2/2010 | Gupta et al. | 455/466 |
| 2010/0124363 A1 * | 5/2010 | Ek et al. | 382/118 |
| 2010/0130238 A1 * | 5/2010 | Kupsh et al. | 455/466 |
| 2011/0047388 A1 * | 2/2011 | Park et al. | 713/189 |
| 2011/0065419 A1 * | 3/2011 | Book et al. | 455/411 |
| 2011/0151837 A1 * | 6/2011 | Winbush, III | 455/412.1 |
| 2011/0237222 A1 * | 9/2011 | Niejadlik | 455/411 |
| 2012/0080949 A1 * | 4/2012 | Gelonese | 307/31 |
| 2012/0096514 A1 * | 4/2012 | Tuscano et al. | 726/1 |
| 2012/0096515 A1 * | 4/2012 | Soudani et al. | 726/1 |

OTHER PUBLICATIONS

Hyperdyne Software; Snitch Enterprise Auditor—Detect, Report and Clean Workplace Pornography Across the Network; http://www.hyperdynesoftware.com; 8 pages, May 17, 2010.

* cited by examiner

*Primary Examiner* — Haresh N Patel

(57) ABSTRACT

Methods, devices, and products provide for restricting access to mature content by individuals for whom access to the mature content is designated as inappropriate. A content filter receives a communication, determines that the communication includes an image, and extracts the image. The image is scanned for mature content. A content restrictor component restricts access by various classes of users to the mature content.

4 Claims, 12 Drawing Sheets

RESTRICTING MATURE CONTENT

SUMMARY

Embodiments of our technology are defined by the claims below, not this summary. A high-level overview of various aspects of our technology are provided here for that reason, to provide an overview of the disclosure, and to introduce a selection of concepts that are further described below in the detailed-description section. This summary is not intended to identify key features nor essential features of the claimed subject matter, nor is it intended to be used as an aid in isolation to determine the scope of the claimed subject matter. In brief and at a high level, this disclosure describes, among other things, ways to restrict a user's access to mature content.

In a first aspect, computer-executable instructions include code that facilitates a method of controlling access to mature content. In embodiments, mature content includes content that has been designated as inappropriate for viewing by a designated class of people. Illustrative embodiments of the method include receiving a communication, determining that the communication includes an image, determining that the image includes mature content, and restricting access to the mature content.

In a second aspect, computer-executable instructions facilitate a method of controlling access to mature content contained in a communication between two or more devices by utilizing a network element. Illustrative embodiments of the method include receiving, at the network element, a communication from a first device, where the communication is directed to a second device. In embodiments, the network element determines that the communication includes an image, determines that the image includes mature content and restricts access by the recipient to the mature content.

In a third aspect, computer-executable instructions facilitate a method of controlling access to mature content contained in a communication that is received at a computing device by way of a data card. In embodiments, the illustrative method includes receiving a communication that is made up of a plurality of data packets. The data card determines that the communication includes an image and assembles the image from the plurality of data packets. Embodiments of the illustrative method further include determining that the image includes mature content; and restricting access to the mature content.

BRIEF DESCRIPTION OF THE SEVERAL VIEWS OF THE DRAWINGS

Illustrative embodiments of the technology are described in detail below with reference to the attached drawing figures, wherein.

DETAILED DESCRIPTION

Figure 1:
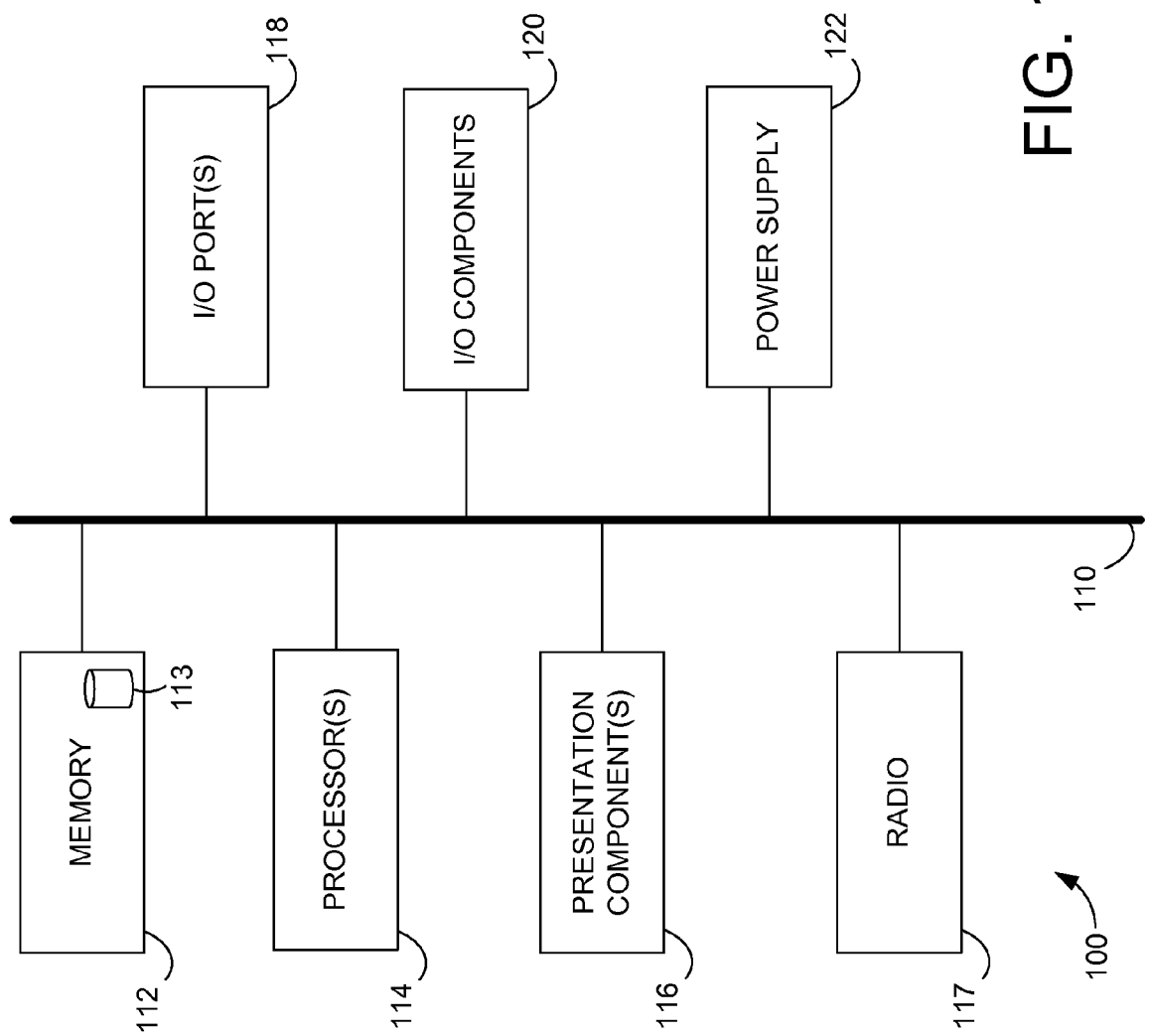
FIG. 1 depicts an illustrative device suitable for use in connection with embodiments of the invention.

The subject matter of the present technology is described with specificity herein to meet statutory requirements. However, the description itself is not intended to define the technology, which is what the claims do. Rather, the claimed subject matter might be embodied in other ways to include different components, steps, or combinations of components or steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

| | |
|---|---|
| AAA | Access, Authentication, Accounting |
| ACL | Access Control List |
| API | Application Programming Interface |
| CDMA | Code Division Multiple Access |
| CD-ROM | Compact Disc Read-Only Memory |
| DVD | Digital Versatile Disc |
| EDGE | Enhanced Data Rates for GSM Evolution |
| EEPROM | Electrically Erasable Programmable Read-Only Memory |
| GIS | Geographic Information System |
| GPRS | General Packet Radio Service |
| GSM | Global System for Mobile Communications |
| LED | Light-Emitting Diode |
| LTE | Long Term Evolution |
| MAG | Media Access Gateway |
| MMS | Multimedia Messaging Service |
| PDA | Personal Digital Assistant |
| RAM | Random Access Memory |
| ROM | Read-Only Memory |
| SMS | Short Message Service |
| TDMA | Time Division Multiple Access |

| | |
|---|---|
| USB | Universal Serial Bus |
| WiMax | Worldwide Interoperability for Microwave Access |
| XML | Extensible Markup Language |

Embodiments of the technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-executable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Aspects of embodiments of the invention described herein provide for restricting access to mature content. As it is used herein, the phrase "mature content" refers to any type of content that is inappropriate for a user to experience (e.g., view, hear, read, etc.). It should be understood that the terms "content" and "inappropriate" can each have a wide variety of meanings, many of which are considered to be within the ambit of the present invention. In some embodiments of the invention, "mature content" may be defined more formally (such as, e.g., during implementation, by a network administrator or the like) to mean content that is inappropriate for viewing by a designated class of people. In embodiments, classes of people can be designated automatically, by a network administrator, individually, by a parent, or anyone else including by applications, programs, APIs, user inputs, third-party content-vendors and the like.

According to embodiments, for example, mature content can be defined to include any content that would fit a legal definition (e.g., from a statute, regulation, court decision, etc.) of pornography. In some embodiments, mature content might be defined to include any content that has a particular rating such as, for example, PG-13 or higher. It should be understood that, in various implementations of aspects of the invention, mature content can be defined in any number of ways, as can the term "inappropriate." By implementing aspects of embodiments of the invention, network administrators, parents, teachers, managers, and the like can manage access to mature content by network users, children, students, employees, and the like. While parental filters and other content filters are known in the art, these filters typically depend on ascertaining information about a communication such as, for example, where the communication originated, to whom it is directed, its size, whether it has current certificates, and the like.

By utilizing embodiments of the invention, mature content can be identified based on the content itself, without having to ascertain any information (e.g., metadata) associated with the content or the message in which it is contained. This feature can be advantageous for a number of readily apparent reasons including, for example, to restrict the communication of pornographic or otherwise sexually-inappropriate content to young people (e.g., to minors who are legally prohibited from viewing and/or possessing such content).

For instance, a growing trend among young people has caught the attention of lawmakers and parents alike. The term is sometimes referred to as "sexting" and is often characterized by situations in which a young person sends an inappropriate (e.g., pornographic) picture, or other inappropriate content, to another young person through some communication service such as, for example, through an instant messaging service, an SMS service, an MMS service, an email service, or the like. Various aspects of embodiments of the invention facilitate restricting access to such mature content by individuals that belong to one or more restricted classes.

As the term is used herein, "restricted class" refers to a group (e.g., classification) of individuals that has been designated as a group of individuals for whom access to mature content (or a particular type of mature content) would be inappropriate. In embodiments, restricted classes can be designated in any suitable manner and can be defined by any number of different criteria. For example, in an embodiment, one restricted class might be minors (e.g., individuals that are younger than a legal age for viewing pornography). In another embodiment such as, for example, where aspects of the invention described herein is implemented on a family mobile device, a restricted class can be a child (or children). It should be apparent that, according to various embodiments of the invention, a restricted class might include a single, particular individual, while in other embodiments, a restricted class might include millions of people (e.g., anyone meeting a set of designated criteria).

To restrict access to mature content, embodiments of the invention provide a content filter. As the term is used herein, "content filter" refers to a component of a computing device (i.e., software, hardware, firmware, or a combination thereof) that facilitates restricting access to mature content by individuals that belong to one or more restricted classes. As mentioned above, the content filters described herein as embodiments of the invention facilitate identification of mature content by analyzing the content itself and restricting access to the identified mature content by individuals belonging to a restricted class (referred to herein, interchangeably, as "members of a restricted class" and "restricted users").

According to embodiments of the invention, the content filter receives a communication such as, for example, an email, an MMS message, an SMS message, an instant message, or the like, and determines whether the communication includes any images. In embodiments, communications can have images embedded therein or attached thereto. Upon determining that the communication includes an image, the content filter extracts the image and scans the image to determine whether the images contain mature content. If the image is determined to include mature content, the content filter can, according to various embodiments, perform any number of different actions to restrict access to the mature content by members of a restricted class.

According to various embodiments of the invention, a content filter can be placed in any number of physical or logical locations. For example, in an embodiment, a content filter is placed on a mobile device such that, for example, if a minor is using the mobile device, any mature content that another individual communicates to the mobile device is not viewable by the minor user. Other embodiments of the invention a content filter implemented on a network element in a mobile network. For example, in an embodiment, a content filter may be included on a network server through which mobile communication traffic flows. In this manner the content filter can intercept communications, determine whether the communications include images, extract images from communications, scan the images for mature content, and restrict access to the mature content by restricted users.

According to various embodiments of the invention, upon determining that an image in a communication contains mature content, the content filter located on the network element can perform any number of different actions to prevent a restricted user from viewing the content. For example, in an embodiment, if the recipient is a minor user, the network can simply remove the image from the communication before forwarding the communication onto the minor user's mobile device. In other embodiments, the content filter can determine the intended recipient or the intended recipient's device and interact with a billing entity such as, for example, an AAA server to determine information about the intended recipient. For example, a billing record can identify whether the intended recipient is a minor. In some embodiments, the content filter located on the network may, upon identifying mature content in a communication, encrypt the mature content and/or the image in which the mature content is identified. In an embodiment, the network server can forward the communication through the network to the recipient using some functionality for allowing an adult user to authenticate the adult user's identity and/or age to the network, to obtain permission to access mature content.

In another embodiment, a content filter is implemented on a data card. It should be understood by those having skill in the art that a data card can be inserted into a computing device to facilitate communications such as, for example, broadband communications, between the computing device and other devices, networks, and the like. According to embodiments, a data card can include components for detecting an image in a communication, assembling the image from a number of data packets, scanning the image to determine whether it includes mature content, and if so, removing the image from the communication. In embodiments, the content filter on the data card can also notify a connection manager application of the mature content. The connection manager, in turn, can provide alternate content, encrypt mature content, impose authentication restrictions, and the like.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Various memory components that memory 112 might take the form of have been previously described. Thus, further elaboration thereon is unnecessary here, only to say that memory component 112 can include any type of medium that is capable of storing information (e.g., a database). A database can be any collection of information. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and execute them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, EDGE, GPRS, TDMA, GSM, and the like (including what is known in the art as WiMax technology and also Long Term Evolution (LTE)). In some embodiments, radio 117 might also facilitate other types of wireless communications including Wi-Fi communications, Bluetooth® communications, and GIS communications.

Input/output (I/O) ports 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
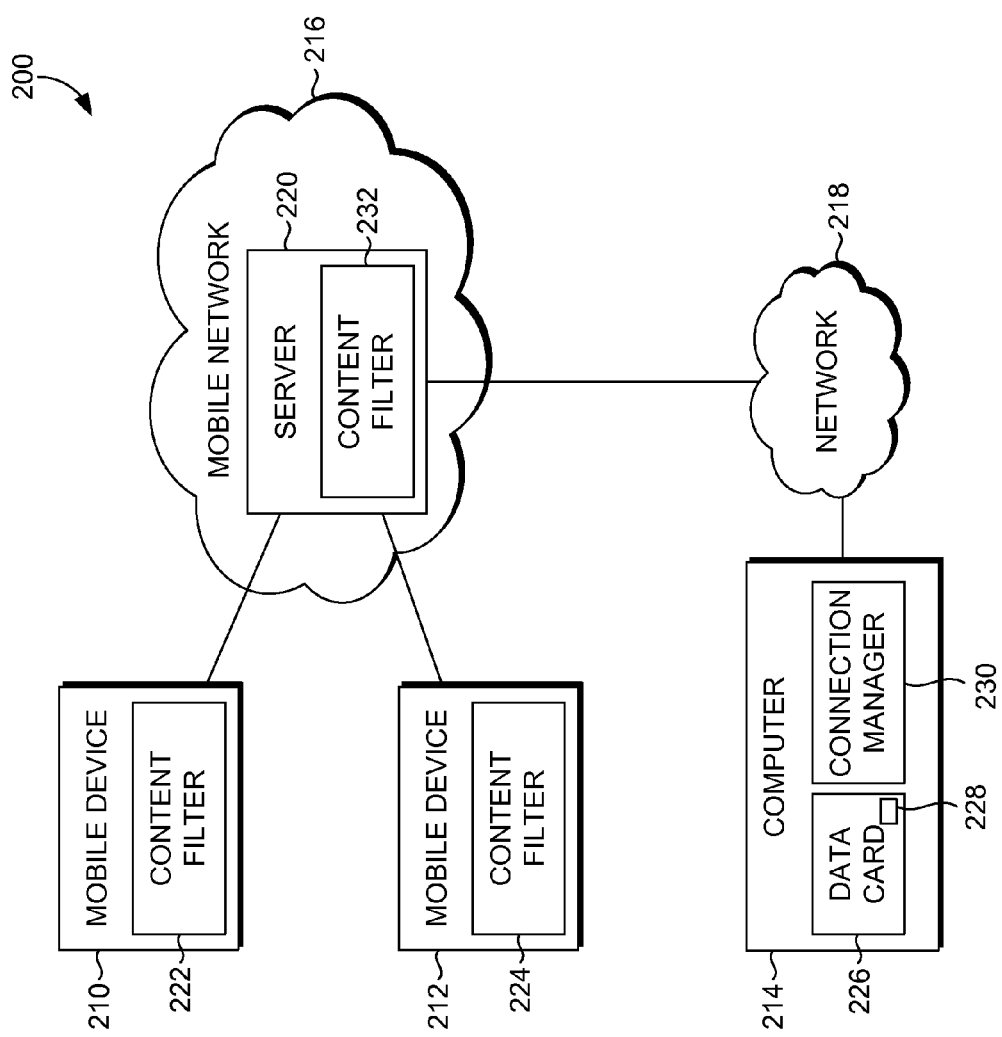
FIG. 2 depicts an illustrative network environment suitable for practicing embodiments of the invention.

Turning now to FIG. 2, an illustrative network environment 200 suitable for practicing embodiments of the inventions is depicted. Illustrative network environment 200 includes mobile devices 210, 212 and 214, mobile network 216 and network 218. The exemplary network environment 200 shown in FIG. 2 is an example of one suitable network environment 200 and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein.

In embodiments, other arrangements and elements (e.g., machines, components, interfaces, functions, orders, servers, databases, etc.) can be used in addition to, or instead of, those shown and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions can be carried out by a processor executing instructions stored in memory.

Mobile devices 210 and 212 can be any type mobile communication devices capable of sending and receiving communications communication via network 218 and/or mobile network 216. For example, in embodiments, mobile devices 210 and 212 can include cell phones, smartphones, PDAs, mobile computers, and the like. Computer 214 can be any type of computing device capable of receiving and sending communication via network 218 and/or mobile network 216. In embodiments, computer 214 includes devices such as, for example, desktop computers, laptops, portable computers, smart devices, and the like. For example in one embodiment, computer 214 can be a computing device such as computing device 100, described above with reference to FIG. 1.

According to various embodiments of the invention, as illustrated in FIG. 2, any number of devices in illustrative network 200 can be equipped with a content filter 222, 224, 226, and/or 232. As illustrated in FIG. 2, for example, mobile device 210 or 212 may include content filter 222, or 224, respectively. As explained in more detail below, content filters 222, 224, 226, and 232 can facilitate detecting images in communications, extracting the images, scanning the images for mature content, and restricting access to identified mature content by members of a restricted class. In some embodiments, computer 214 might include, for instance, a data card 226. Data card 226 can include a content filter 228. Because data cards typically do not have large amounts of processing power, a connection manager 230 can interface with the data card to assist in providing the access-restriction functionalities described herein.

Figure 3:
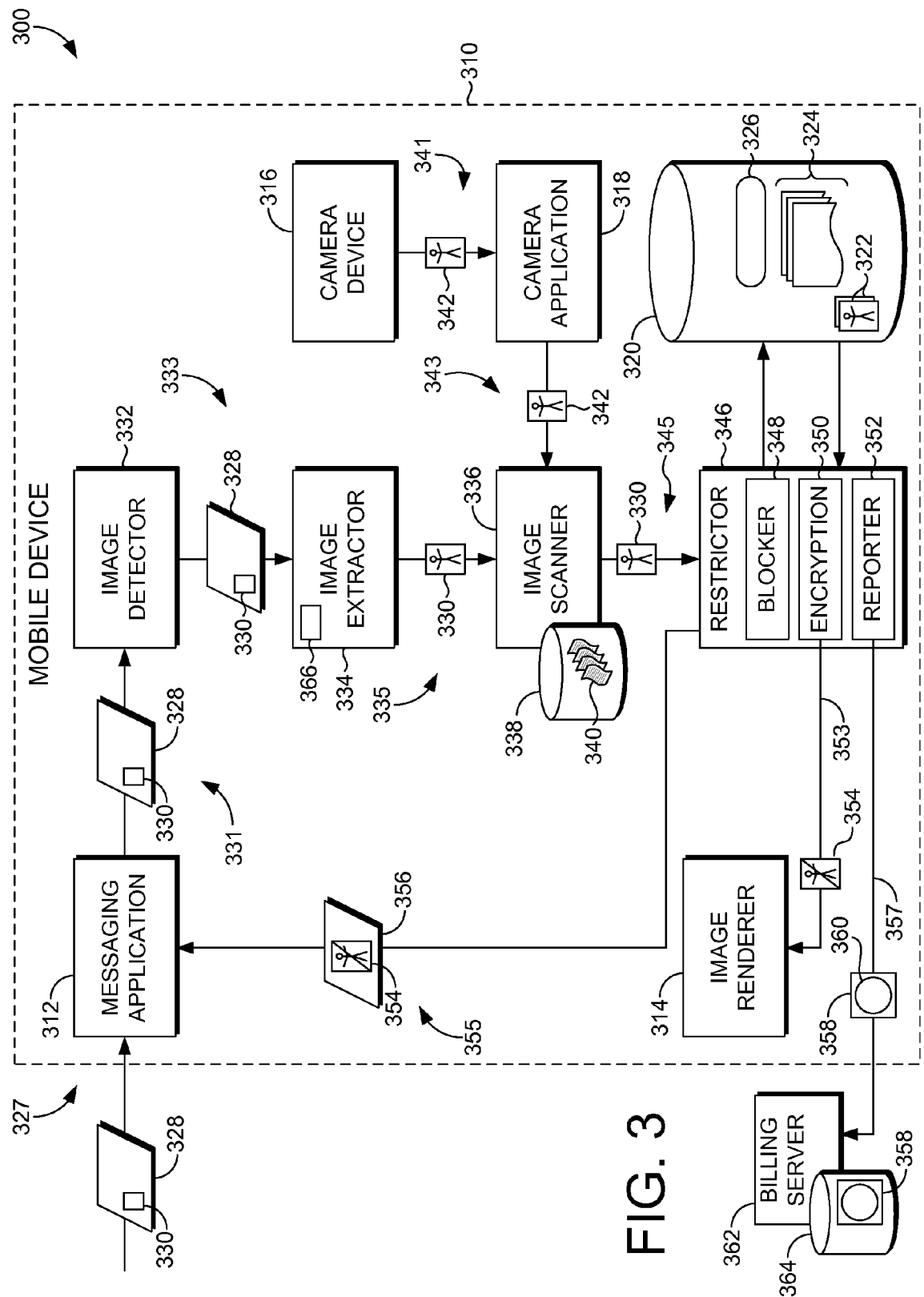
FIG. 3 depicts an illustrative implementation of aspects of a content restrictor on a mobile device in accordance with an embodiment of the invention.

Turning to FIG. 3, a block diagram depicts an exemplary operating environment 300 in which a mobile device 310 is equipped with a content filter 311. The exemplary operating environment 300 shown in FIG. 3 is an example of one suitable operating environment 300 and is not intended to suggest any limitation as to the scope of use or functionality of embodiments of the inventions disclosed throughout this document. Neither should the exemplary operating environment 300 be interpreted as having any dependency or requirement related to any single component or combination of components illustrated therein. For example, in various embodiments, components of mobile device 310 can be implemented in any number of configurations, using any number of program modules, applications, and the like. It should be understood by those knowledgeable in the art that each of these elements of operating environment 300 also can be scalable. That is, for example, operating environment 300 can include a large number of mobile devices.

In embodiments, other arrangements and elements (e.g., machines, components, interfaces, functions, orders, servers, databases, etc.) can be used in addition to, or instead of, those shown in FIG. 3, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions can be carried out by a processor executing instructions stored in memory.

As illustrated in FIG. 3, mobile device 310 includes exemplary components of a content filter 332, 334, 336, and 346; messaging application 312; image renderer 314; camera device 316; camera application 318; and storage 320. Storage 320 can include any suitable type of storage such as for example memory 112 illustrated in FIG. 1. In embodiments of the invention storage 320 can be used to store any number of different types of files items or other data such as for example images 322 application data 324 and alternate content 326. In embodiments, for instance, alternate content 326 can be provided to a user of a restricted class in lieu of providing an original image that is determined to include mature content. In some examples mobile device 310 may acquire alternate content 326 from the user, internal storage, a network, or any other suitable source.

In operation, embodiments of the invention include receiving, at a mobile device 310, a communication 328 that includes an image 330, as indicated by reference numeral 327. In embodiments a messaging application 312 receives communication 328. Messaging application 312 can be any type of application, API, program, or the like that is configured for facilitating some form of communication between mobile device 310 and some other device, according to various embodiments of the invention. In embodiments, messaging application 312 provides a user interface and functionality that allow a user to generate, send, receive, and render communications.

As illustrated in FIG. 3, components of a content filter deployed on mobile device 310 include image detector 332, image extractor 334, image scanner 336 and content restrictor 346. As shown by reference number 331 in FIG. 3, image detector 332 receives the communication 328 from messaging application 312. Image detector 332 can be any type of image detecting software, program module, hardware, firmware, and the like, that is adapted for detecting images embedded in, attached to, or otherwise associated with a communication 328.

As indicated by reference numeral 333, upon detecting an image 330 in communication 328, image detector 332 provides communication 328 to image extractor 334, which extracts image 330 from communication 328. According to various embodiments of the invention image extractor 334 can be any type of program, application, API, function, or the like that extracts an image from a communication. In embodiments, as the term is used herein, "extracting an image" can include removing an image, referencing an image, copying an image, assembling an image, or otherwise obtaining data that, when processed, causes display of an image. In embodiments, image extractor 334 might be integrated with image detector 332, image scanner 336, and/or content restrictor 346. According to various embodiments of the invention, image extractor 334 extracts image 330 by assembling image 330 from various data packets (not shown). In various embodiments of the invention image extractor 334 can extract any number of images 330.

As is further illustrated in FIG. 3 at 335, image scanner 336 receives image 330 from image extractor 334. In embodiments of the invention image scanner 336 can include an application, an API, a program module, a portion of computer code, a set of instructions, and the like. As is further illustrated in FIG. 3, image scanner 336 can interact with database 338. In various embodiments of the invention database 338 includes feature template 340. Image scanner 336 can, in various embodiments, include functionalities similar to those known in the arts that are used for face recognition. That is, for example, image scanner 336 can analyze individual pixels of image 330 to detect portions of image 330 that image scanner 336 can recognize as, for example, mature content. According to embodiments of the invention, for example, image scanner 336 references one or more feature templates 340, maintained in database 338.

In embodiments, feature template 340 can include, for example, a data structure, portion of computer code, XML files, or the like, that include the representation of a feature. In various embodiments the features represented in feature templates 340 are features that have been designated as being mature content, including mature content, or being associated with the probability of being a portion of mature content. In operation, image scanner 336 can reference feature template 340 and compare the representations of features in feature template 340 to features identified in image 330. So, for example, if image scanner 336 determines that a portion of image 330 is consistent with a representation of a feature in feature template 340, image scanner can use that information, for example, as a basis for determining that image 330 includes mature content. In some embodiments of the invention image scanner 336 determines whether or not image 330 includes any mature content. In various embodiments, image scanner 336 can determine portions of image 330 that include mature content.

According to some embodiments of the invention, image scanner 336 can also be configured to identify types of mature content found in image 330. For example, in some implementations, it may be desirable to define mature content according to several different types thereof for classification. For instance, in some embodiments, image scanner 336 might determine that a portion of image 330 includes mature content that correspond to a particular level on a rating system similar to, for example, a movie rating system. In this manner, by implementing embodiments of the invention, mature contents can be restricted not only on the basis of, for example, a recipient's age, but also can be access to mature content can be restricted based on varying classifications of mature content and/or restricted classes of users.

With continuing reference to FIG. 3, content restrictor 346 receives image 330 from image scanner 336. In embodiments of the invention, content restrictor 346 receives image 330 from image scanner 336. In other embodiments of the invention content restrictor 346 receives communication 328 including image 330 from image scanner 336, messaging application 312, or some other component of mobile device 310, whether illustrated in FIG. 3, or not. According to some embodiments of the invention, content restrictor 346 receives image 330 from image scanner 336 and (although not shown in FIG. 3 for the sake of clarity) content restrictor 346 receives communication 328 from messaging application 312, image extractor 334, or the like. In that instance, content restrictor 346 may, if appropriate, rejoin communication 328 and image 330.

According to embodiments of the invention, content restrictor 346 can perform any number of actions to restrict access to mature contents identified in image 330. In some embodiments, for example, content restrictor 346 includes blocker 348, encryption 350, and reporter 352. For example, in some embodiments, content restrictor can block access of image 330 and/or mature content identified in image 330 (e.g., portions of image 330 that have been identified as including mature content). In some embodiments content restrictor 346 can block access to mature content by, for example, removing image 330 from communication 328, by not reinserting image 330 in communication 328, by causing image 330 to be unable to be rendered (e.g., displayed), such as, for example, by corrupting the code defining image 330, or by any other suitable method of blocking access to mature content in image 330 by a member of a restricted class.

As indicated above, content restrictor 346 also includes encryption 350. In embodiments, encryption 350 can include a program module, API, function, or the like that can be used to encrypt image 330, a portion of image 330, or communication 328. In this manner, for example, a user can configure a mobile device 310 such that if mature content is received in a message, the device 310 can be required to authenticate a user before allowing access to mature content. According to various embodiments of the invention any number of different types of encryption can be used to encrypt communication 328; image 330; or a portion of image 330 that contains mature content.

As shown by reference numeral 353 in FIG. 3, content restrictor 346 can, if appropriate, provide image 330 to image renderer 314. In embodiments, content restrictor can apply some restriction to image 330 and provide image restricted image 354 to image renderer 314. It should be understood by those having knowledge in the relevant arts, that restricted image 354 may pass through any number of additional components of mobile device 310 such as, for example, decryption components, authentication components, and the like.

In some embodiments of the invention alternate content 326 can be provided to a user who is a member of a restricted class instead of mature content that has been identified in image 330. In various embodiments content restrictor 346 can access alternate content 326 from storage 320. In other embodiments content restrictor 346 can receive alternate content 326 from another device, a network, a third party user, a website, or the like. In some embodiments content restrictor 346 can, for example, remove mature content from image 330 and replace it with alternate content 326. In some embodiments content restrictor 346 replaces the entire image 330 with alternate content 326. In further embodiments content restrictor 346 may replace portions of image 330 with alternate content 326. In other embodiments, content restrictor 346 can cover, or mask, mature content with alternate content 326. In various embodiments, alternate content 326 can be provided to a restricted user in any number of other manners as well.

According to embodiments of the invention, alternate content 326 can include any type of content such as for example, advertisements, warnings, notifications, images, text, video, hyperlinks, and the like. For example, in one embodiment, content restrictor 346 may insert alternate content 326 into communication 356 which can be provided to messaging application 312. In embodiments, communication 356 is a version of communication 328 that includes some content 354 other than the original image 330 such as, for example, alternate content 326, restricted image 354, or the like. Messaging application 312 can cause communication 328 to be displayed to user where the user may be allowed access only through a portion of content contained therein and the like.

As further indicated above content restrictor 346 also includes reporter 352. In embodiments reporter 352 can interact with a billing server 362. Reporter 352 can generate a report 358 that includes an indication 360 that mature content was identified in an image 330 or communication 328 or a portion of image 330. In embodiments mobile device 310 provides the report 358 to a network element such as, for example, billing server 362 which can store the report 358 in associated storage 364. In this manner, access to mature content can be monitored and tracked for billing, informational, management, and other purposes. It should be understood that billing server 362 can utilize report 358, or provide reports 358 to other network elements, for any number of different types of processing.

Although the discussion above generally refers to communication 328 as one that is received from another device remote from mobile device 310, in some embodiments of the invention, communication 328 can be a communication from a user or other local entity. That is, for example, mobile device 310 can be configured to restrict access to mature content that is inputted to mobile device 312 in a manner other than by a communication from a remote device. In some embodiments communication 328 can include any number of different types of data, information, inputs, and the like. For example, in some embodiments, mobile device 310 includes a camera device 316 which can be any type of image-capturing device, video-capturing device, or the like.

By implementing embodiments of the invention, an image 342 that is captured by camera device 316 can be provided to content filter 332, 334, 336, and 346 for scanning for mature content. For example, as shown in FIG. 3 by reference numeral 341, a camera application 318 receives image 342 from camera device 316. In embodiments camera application 318 can interact with content filter 311 such as, for example, by providing image 342 to image scanner 336, as shown by reference numeral 343 in FIG. 3. Image scanner 336 can determine whether image 342 includes mature content.

In embodiments, access to image 342, captured by camera device 316, can be restricted in any number of ways such as for example, by not allowing image 342 to be saved to storage 320 on mobile device 310. In some embodiments image 342 may be stored on mobile device 310, but subsequent access to it can be restricted. Thus, for example, in an embodiment, when a user attempts to attach image 342 to an email having a restricted user listed in the "to" field, restrictor 346 can block the attachment. In other embodiments, restrictor 346 can be adapted to encrypt image 342 upon attachment to a communication. In further embodiments, alternate content can be used to replace image 342, either on mobile device 310 or in an outgoing message.

In some instances, users may desire to have the ability to determine whether there are any images on mobile device 310 that include mature content. In an embodiment, image extractor 334 includes a flagging module 366. In other embodiments, flagging module can be included in any other component of mobile device 310 or as an independent component. In embodiments, flagging module is configured to flag images 330 and 342. As the term is used herein, "flagging" an image means associating information with the image. In embodiments, flagging module 366 associates an indication of one or more states with an image 330 or 342 (i.e., flagging module 366 flags an image with an indication of one or more states). In embodiments, flags can be employed in various forms such as, for example, entries in a table (e.g., where the table stores a list of images 322 on mobile device 310 and a list of corresponding flags, etc.), metadata, embedded data, or the like.

For example, in an embodiment, image scanner 336 can be used (e.g., in response to a user input, a network input, an automatic event, a predetermined time frame, etc.) to scan all of the images 322 residing in storage 320 on mobile device 310. Flagging module 366 flags each scanned image with an indication that the image has been scanned and with an indication of whether the image includes mature content. In some embodiments, images can be flagged with, for example, an indication of a type of mature content included in the image, an indication of a location of mature content in the image (i.e., an indication of which portion of the image includes mature content), and the like.

In embodiments, flags can also include other relevant data such as, for example, a time-stamp corresponding to the time at which the image was scanned, an indication of what prompted the scan, an indication of a user that initiated the scan, and the like. In this manner, image extractor 334, image scanner 336, or some other component can determine, upon referencing or accessing an image 322, whether the image 322 has been scanned for mature content and if so, whether the image 322 includes mature content (and, in embodiments, what type of mature content the image includes). In some embodiments, access to different types of mature content may be restricted for different individuals (e.g., restricted classes) and, in some implementations, flagging module 366 can flag images 322 with an indication of which restricted classes are associated with the image 322 (i.e., which classes of people should be restricted from accessing the image 322). In other embodiments, flagging module 366 might only flag images with an indication of whether the images include mature content (and/or what type of mature content the images include. In this manner, the presence of a flag (either indicating that the image includes mature content or that the image does not include mature content) can be interpreted by flagging module 366 as evidence that the image has been scanned.

Accordingly, in some embodiments of the invention, when a communication 328 that contains an image 330 is received, flagging module 366 checks for flags, thereby determining whether the image 330 previously has been scanned. If the image has not been scanned, it may be provided to image scanner 336, as described above. Flagging module can flag image 330 to indicate that it has been scanned. On the other hand, if image 330 is determined to have been scanned already, flagging module 366 determines, by examining corresponding flags, whether image 330 has been determined to include mature content. If so, image 330 can be provided directly to restrictor 346 for restriction processing. If not, image can bypass restrictor, for example, and be accessible to a user.

Figure 6:
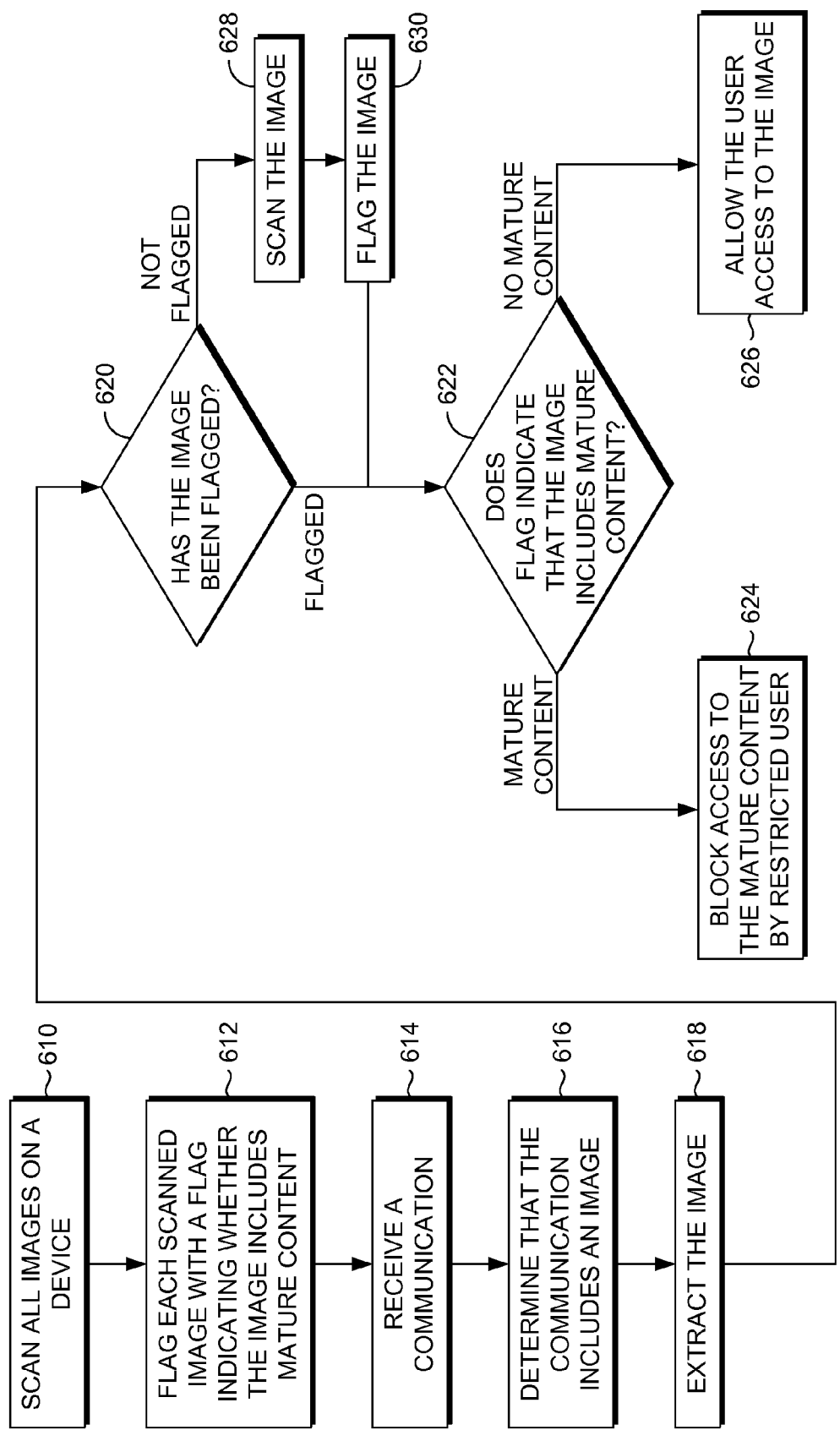
FIG. 6 is a flow diagram depicting an illustrative method of utilizing flags to manage access restrictions to mature content in accordance with embodiments of the invention.

To illustrate the flagging procedure described above, turn briefly to FIG. 6. FIG. 6 is a flowchart depicting an illustrative method of utilizing flags to facilitate content restriction management of images in a mobile device. At a first illustrative step, step 610, an image scanner scans all images found on the mobile device. In embodiments, the image scanner can scan the images to determine whether the images include mature content, what type of mature content the images include, and the like. At step 612, a flagging module flags each scanned image with a flag indicating whether the image includes mature content. In some embodiments, additional flags can be utilized to convey other types of information about the image, as well.

At step 614, a communication is received. In embodiments, the communication can be a communication originating at a device remote from the mobile device (e.g., an email from a friend, a text message from a colleague, or the like). In other embodiments, the communication can be a communication originating within the device, or otherwise from a local source. For instance, in some embodiments, the communication is an input generated by a user such as, for example, an image that the user has captured using an image-capturing device, which may, in some instances, be disposed within the mobile device. As shown at step 616, an image detector determines whether the communication includes an image.

Upon determining that the communication includes an image, the image is extracted, as shown at step 618. At step 620, a flagging module checks the image for a flag 620. In this manner, the flagging module can determine, for example, whether the image previously has been scanned, as shown at step 622, by determining whether the image is flagged. If the image is flagged, as shown at step 622, the flag is examined to determine whether the flag indicates that the image includes mature content. If the image contains mature content, a content restrictor blocks access to the mature content by a restricted user, as shown at step 624. At step 626, if the image does not include mature content, the content restrictor allows a restricted user to access the image. If the image has not been flagged, the image is scanned, as shown at step 628, and flagged, as shown at step 630.

Figure 4:
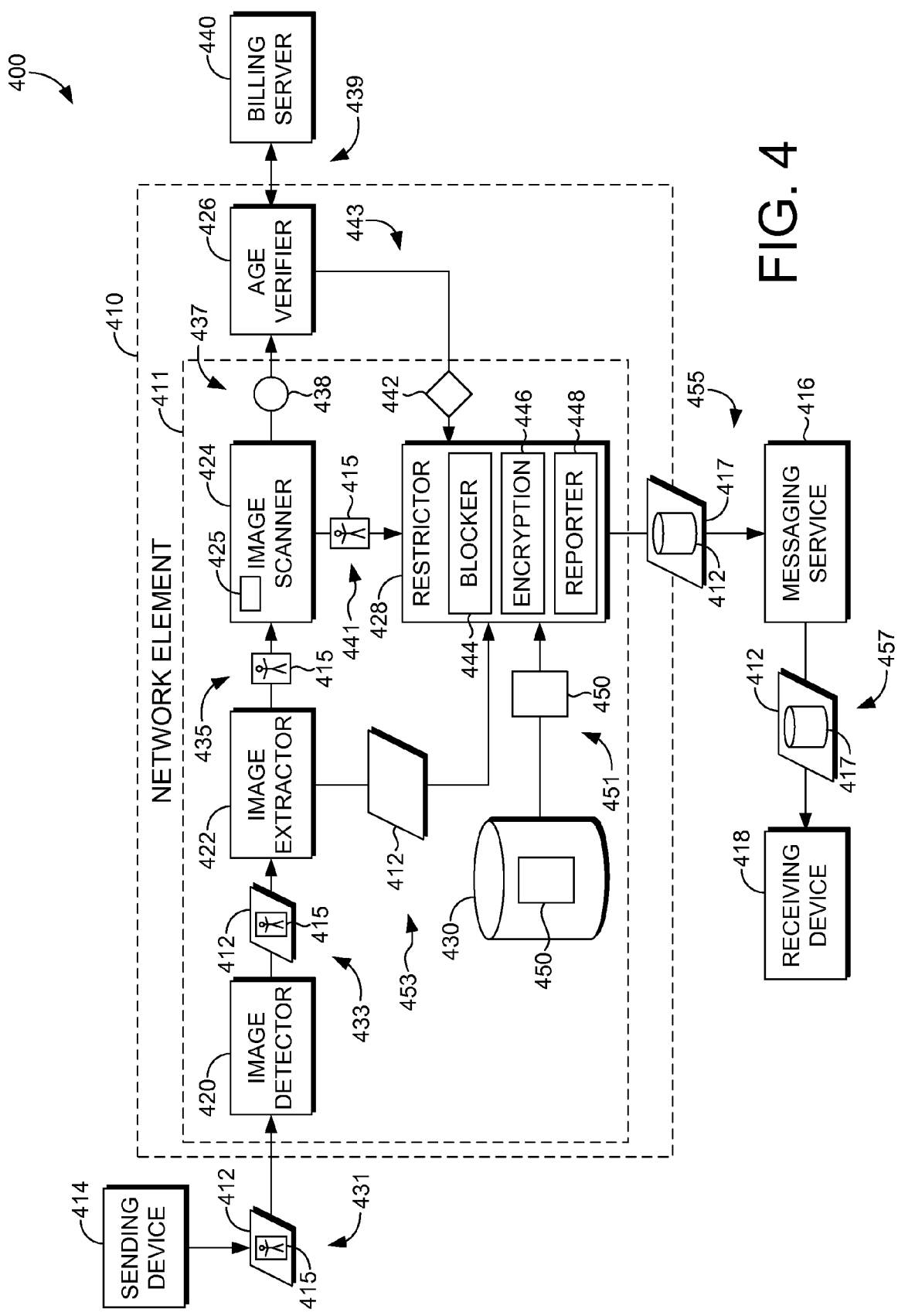
FIG. 4 depicts an illustrative implementation of aspects of a content restrictor on a network element in accordance with an embodiment of the invention.

Turning now to FIG. 4, an illustrative operating environment 400 is depicted in which a content filter 411 is implemented on a network element 410 such as, for example, in a mobile network. According to various embodiments of the invention, network element 410 can include any number of different types of network elements such as, for example, servers, switches, routers, and the like. In one embodiment, for example, network element includes a media access gateway (MAG), while in other embodiments, network element 410 can be a home server, a preferences server, or the like. The exemplary implementation 400 shown in FIG. 4 is an example of one suitable implementation 400 and is not intended to suggest any limitation as to the scope of use or functionality of embodiments of the inventions disclosed throughout this document. Neither should the exemplary implementation 400 be interpreted as having any dependency or requirement related to any single component or combination of components illustrated therein.

As shown in FIG. 4, network element 410 receives a communication 412 that includes image 415, and that originated at sending device 414. In embodiments, the communication 412 is received by image detector 420, as shown by reference numeral 431. As is illustrated by reference numeral 433, upon detection of image 415 in communication 412, image extractor 422 receives communication 412 and extracts image 415 from it. Image scanner 424 receives extracted image 415 from image extractor 422, as shown at reference numeral 435 and scans the image.

As is further illustrated in FIG. 4, image scanner 424, or some other component of network element 410, can be configured to determine whether an intended recipient of communication 412 is in a restricted class. In an example, image scanner 424 may communicate an identification 438 of the intended recipient to an age verifier 426, as shown by reference numeral 437. In embodiments age verifier 426 can include a program module, application, API, function, or the like for determining whether the intended recipient is old enough to view mature content identified in image 415. In some embodiments age verifier 426 interacts with billing server 440 to make this determination. For instance, in some embodiments billing server 440 includes billing records, user profiles, or other information that may include a date of birth or age of the intended recipient. As indicated at 443, billing server 440 can communicate this information 442 to age verifier 426 which can then provide an indication to content restrictor 428 of whether the intended recipient belongs to a restricted class such as, for example, a class of people who are too young to view a certain type of mature content.

In embodiments content restrictor 428 can provide any number of functions to restrict access to mature content identified in image 415. To achieve these ends, similar to the environment 300 illustrated in FIG. 3, content restrictor 428 may include blocker 444, encryption 446, and reporter 448. In embodiments content restrictor can retrieve alternate content 450 from storage 430, websites, or some other location. As shown at 453, content restrictor receives communication 412 from image extractor 422 where it can, if appropriate, reunite communication 412 and image 415. In embodiments, as shown at 455, content restrictor 442 creates a restricted communication by, for example, inserting restricted content 417 into communication 412 which is then forwarded through a messaging service 416 to recipient's receiving device 418, as shown at reference numeral 457. According to various embodiments of the invention, restricted content 417 can include image 415, alternate content 450, an encrypted version of image 415, and the like.

Figure 5:
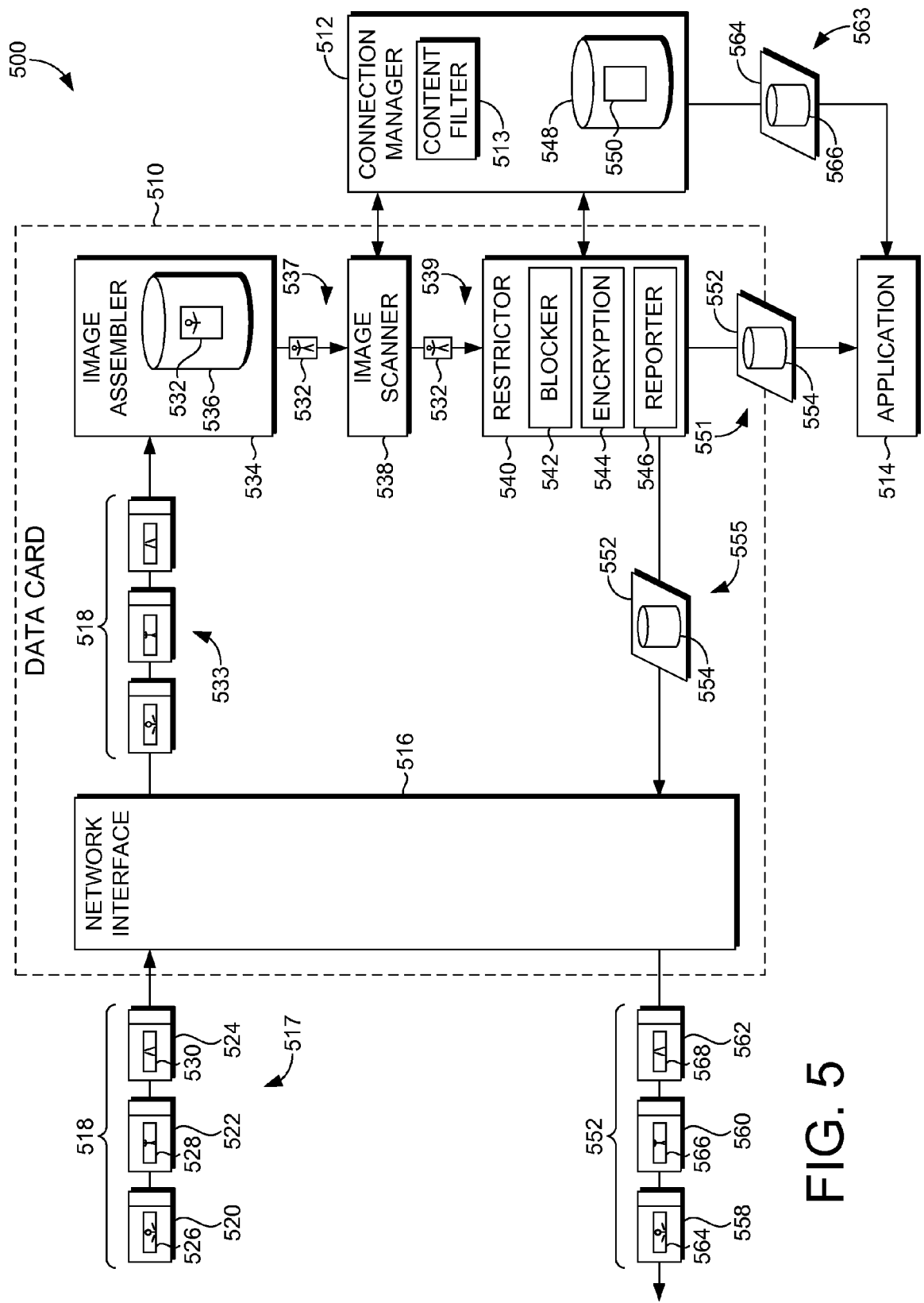
FIG. 5 depicts an illustrative implementation of aspects of a content restrictor on a data card in accordance with an embodiment of the invention.

Turning now to FIG. 5, an illustrative operating environment 500 in which components 534, 538, and 540 of a content filter have been implemented on a data card 510. The exemplary implementation 500 shown in FIG. 5 is an example of one suitable implementation 500 and is not intended to suggest any limitation as to the scope of use or functionality of embodiments of the inventions disclosed throughout this document. Neither should the exemplary implementation 500 be interpreted as having any dependency or requirement related to any single component or combination of components illustrated therein.

According to various embodiments, data card 510 can be inserted into a computer such as computer 116, illustrated in FIG. 1, and can be configured to facilitate communications with other devices through a network. As is further illustrated in FIG. 5, illustrative operating environment 500 also includes connection manager 512 and application 514. In embodiments connection manager 512 can be an application, program module, API, function, or the like, and can be configured to interact with data card 510 to perform any number of functionalities known in the art including, for example, managing internet connections, configuring networks, and the like. In some embodiments, connection manager 512 can include a content filter 513 and provide the content restriction services instead of, or in addition to, implementing a content filter on data card 510. In embodiments connection manager 512 can also include storage 548 for storing alternate content 550 which can be provided to a content restrictor 540 on data card 510.

As illustrated at reference numeral 517, data card 510 receives, at network interface 516, a communication 518. In embodiments, communication 518 includes a number of data packets 520, 522 and 524. In embodiments portions 526, 528, and 530 of an image 532 are included in the data packets 520, 522, and 524. As is shown in FIG. 5, image assembler 534 receives communication 518, via network interface 516, as indicated at 533. Image assembler 534 assembles image 532 using portions 526, 528, and 530 of image 532 contained in the data packets 520 522 and 524. In embodiments, image assembler can include a buffer 536 for storing the assembled image during the assembling process (and any other process that may be employed in accordance with embodiments of the invention).

The assembled image 532 is then provided, as shown at 537, to image scanner 538. As is shown at 539, upon detecting mature content in image 532, image 532 is provided to content restrictor 540. As described above, with reference to FIGS. 3 and 4, content restrictor 540 includes blocker 542, encryption 544, and reporter 546. Content restrictor, as shown at 551, can provide a restricted communication 552 that includes restricted content 554 to, for example, application 514. In another example, such as when communication 518 is received from via input by a user, to create an outgoing communication through data card 510 outgoing communication 552, which includes restricted content 554, can be received by network interface 516 and transmitted as shown at reference numeral 557, by way of a number of packets 558 560 and 562 that include portions 564 of restricted content 554.

Figure 7:
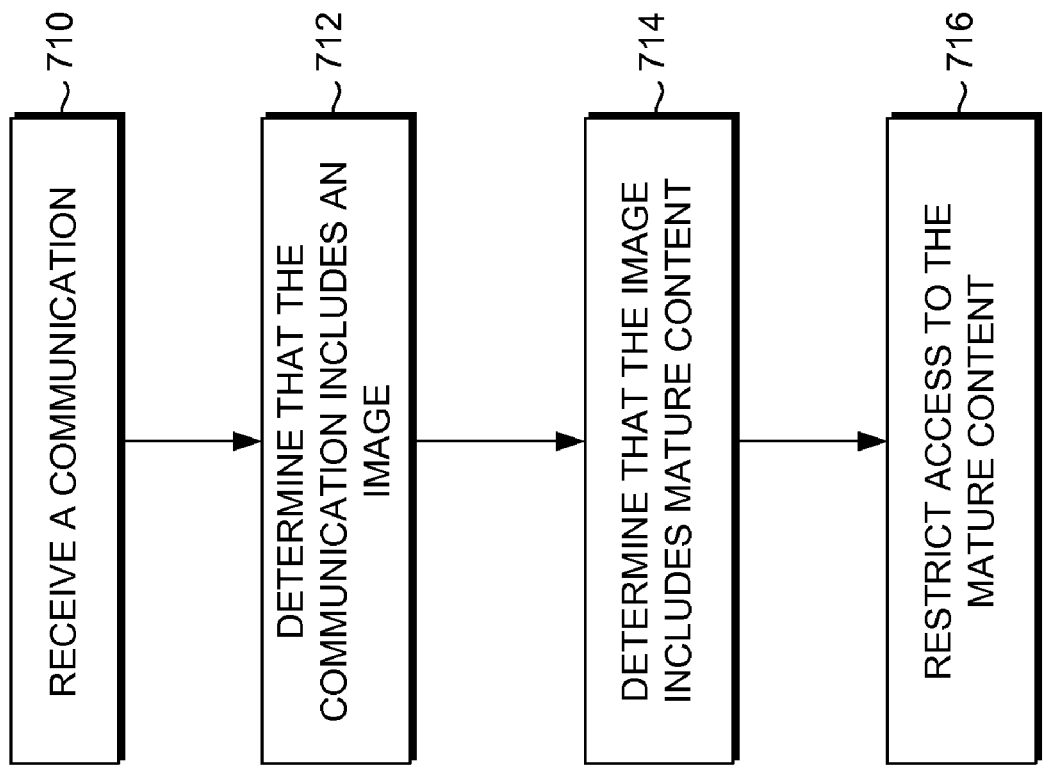
FIG. 7 is a flow diagram depicting an illustrative method of restricting access to mature content in accordance with embodiments of the invention.

To recapitulate, embodiments of the inventions have been disclosed in the context of computer-readable media, a communications device, a network environment, and methods for restricting access to mature content. Turning now to FIG. 7, a flow diagram is provided and shows an illustrative method 700 of restricting access to mature content. In embodiments, the method includes receiving a communication, as illustrated at 710. In embodiments, the communication can be an email, a short-messaging service (SMS) message, a multimedia messaging service (MMS) message, an instant message, or the like.

At a step 712, an image detector determines that the communication includes an image. At step 714, an image scanner determines that the image includes mature content. In some embodiments, determining that the image includes mature content includes determining that the image has been flagged. The flag can be associated with the image and can include an indication that the image includes mature content. At a final illustrative step 716, access to the mature content image is restricted. In embodiments, restricting access to the mature content includes requiring a user to input a login credential before allowing the user access to the mature content. In other embodiments, restricting access to the mature content includes removing the image from the communication before displaying the communication to a user. In some embodiments, restricting access to the mature content includes replacing the mature content with alternate content, wherein a user is allowed access to the alternate content.

Figure 8:
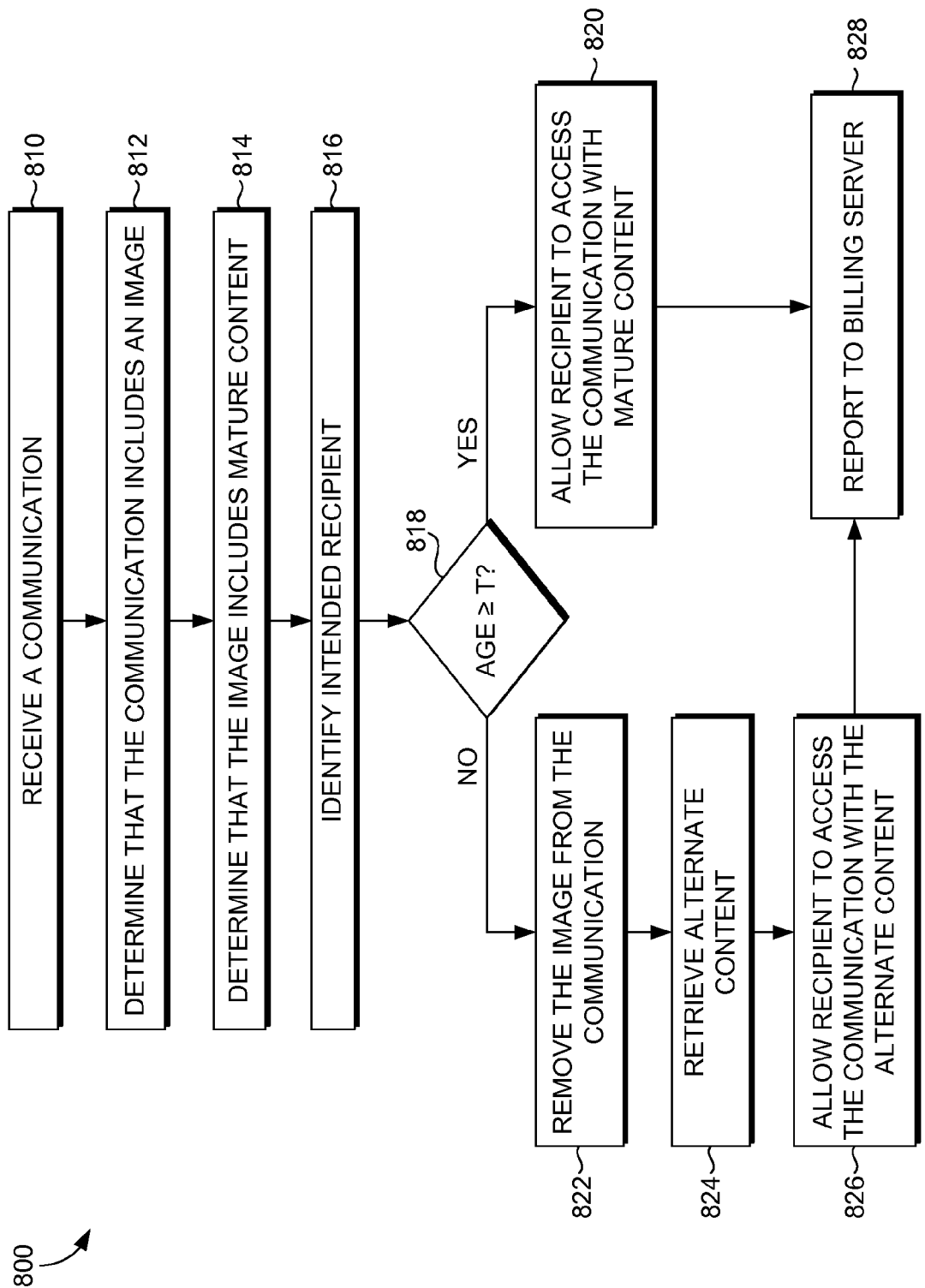
FIG. 8 is a flow diagram depicting an illustrative method of restricting access to mature content in accordance with embodiments of the invention.

Turning now to FIG. 8, a flowchart depicts an exemplary method 800 of restricting access to mature content. At a first illustrative step, step 810, a communication is received. At a second step, step 812, a determination is made that the communication includes an image. At step 814, the image is scanned and determined to include mature content. At step 816, the intended recipient of the image is identified. In embodiments, network elements can interact with, for example, a billing server to verify the age of intended recipients. For example, the age of recipient may then be compared against a threshold (T) to determine whether the age of the recipient is greater than or equal to the threshold, as shown at step 818.

At step 820, if the recipient's age is greater than or equal to the threshold (e.g., if the recipient is an adult), the recipient is allowed access to the communication with mature content. At step 822, if the recipient's age is less than the threshold (e.g., if the recipient is a minor), the image is removed from the communication. In other embodiments, the image can be left in the communication and can be encrypted. In some embodiments, an access control list (ACL) can be associated with the image for controlling the access that various recipients might attempt regarding the image.

As shown at step 824, in some embodiments, the network element retrieves alternate content and, as shown at step 826, allows the recipient to access the communication with the alternate content provided instead of the mature content. In some embodiments, the network element retrieves alternate content from an associated database or other data store. In other embodiments, the network element retrieves alternate content from a remote source such as, for example, a third-party vendor or advertiser. In some embodiments, the network element replaces the portions of the image that include mature content with the alternate content. In other embodiments, the alternate content is provided instead of the image. In various embodiments, alternate content can include warnings, alerts, black "censor" blocks, images, text, or the like.

At a final illustrative step 828, the network element provides a report to the billing server. In embodiments, the report includes an indication that mature content was detected in the image. Additional information can be included in the report, as well, such as, for example, a time-stamp, an identification of the intended recipient, an identification of the sender, and the like. It should be understood that, instead of providing a report to a billing server, the network element can provide reports, notifications, and the like, to any other device, server, component, or user. Such reports, notifications, and the like can includes any number of different types of information related to the communication.

Figure 9:
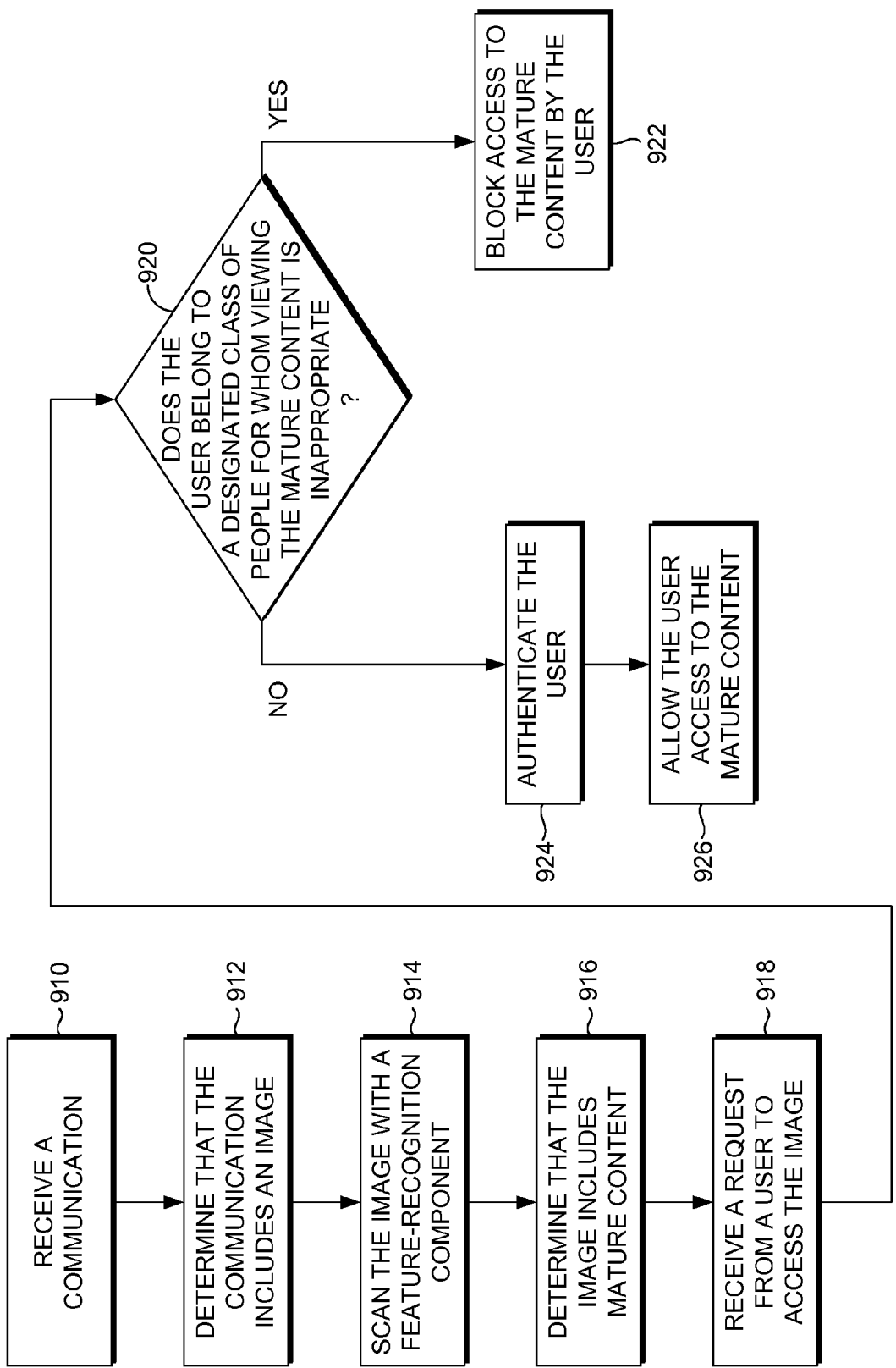
FIG. 9 is a flow diagram depicting an illustrative method of restricting access to mature content in accordance with embodiments of the invention.

Turning now to FIG. 9, a flowchart depicts an illustrative method 900 of restricting mature content. At a first step, step 910, a communication is received. At step 912, an image is detected in the communication. At step 914 the image is scanned with a feature-recognition component and determines, as shown at step 916, that the image include mature content. In embodiments, the image scanner analyzes individual pixels of the image to detect portions of the image that appear to include mature content. According to embodiments of the invention, for example, the image scanner references one or more feature templates. In embodiments, a feature template can include, for example, a data structure, portion of computer code, XML files, or the like, that include the representation of a feature. In various embodiments, the features represented are features that have been designated as being mature content, including mature content, or being associated with the probability of being a portion of mature content.

With continued reference to FIG. 9, at step 918, a request from a user is received to access the image. In embodiments, this request can be in the form of initiation of a process to open a communication such as a message. In other embodiments, the request can be the consequence of the user pressing a "send" button on an email to which the user has attached the image. In other embodiments, the request can be a consequence of the user initiating the attachment sequence to include the image in a message such as, for example, an email. At step 920, a determination is made as to whether the user belongs to a restricted class.

If the user doesn't belong to a restricted class the image may be provided to the user. If the user does belong to a restricted class, with reference to the type of mature content identified, access to the mature content by the user is blocked, as shown at step 922. If, however, the user does not belong to a restricted class, in an embodiment, the user can be authenticated, as shown at step 924. At a final illustrative step, step 926, the user is allowed access to the mature content.

Figure 10:
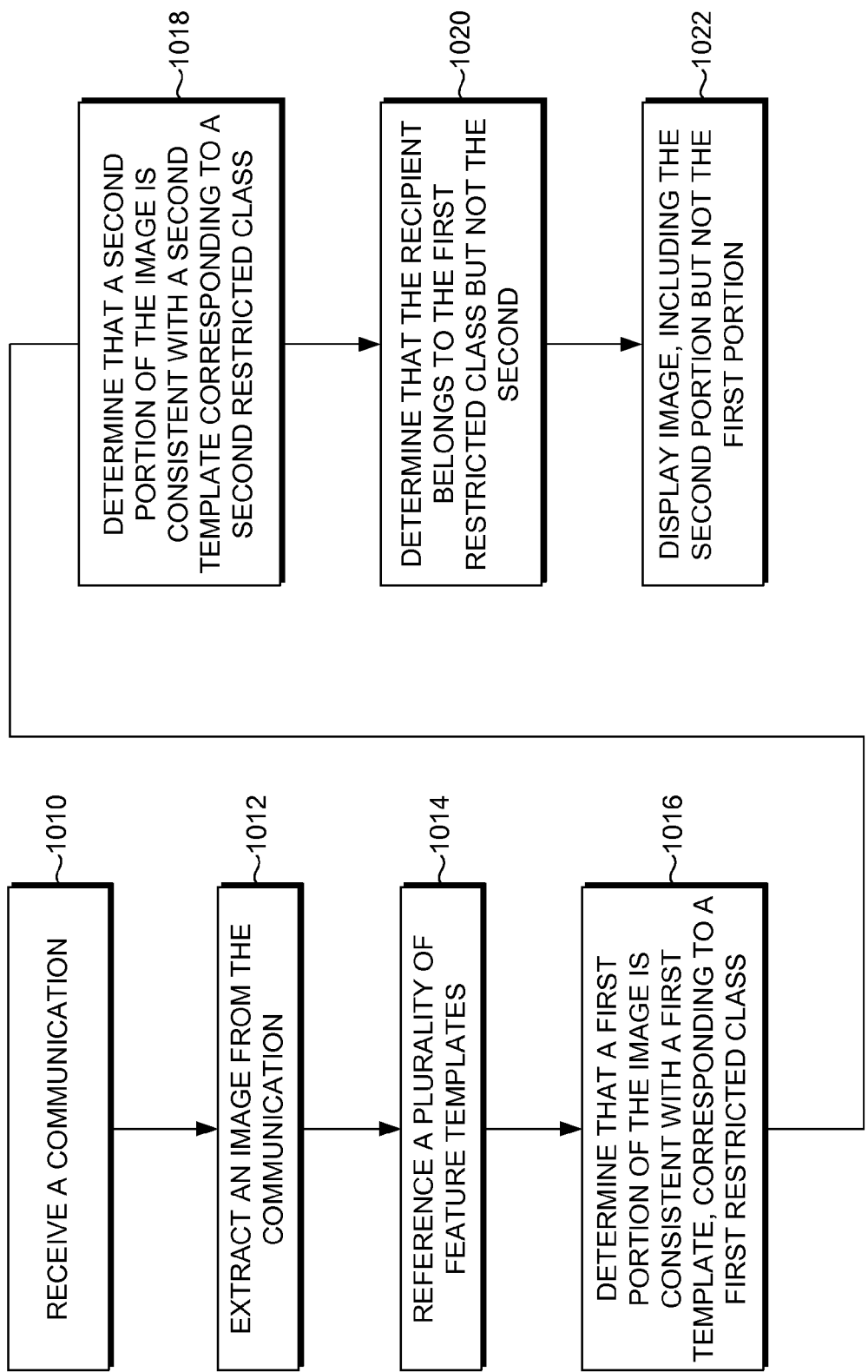
FIG. 10 is a flow diagram depicting an illustrative method of restricting access to mature content in accordance with embodiments of the invention.

Turning now to FIG. 10, a flowchart depicts an illustrative method 1000 of restricting mature content. At step 1010, a communication is received. At step 1012, an image is extracted from the communication. At step 1014, the image is scanned by referencing a plurality of feature templates to determine whether any portion of the image matches, or is consistent with, a feature represented by a feature template.

In embodiments of the invention, as illustrated at step 1016, an image scanner determines that a first portion of the image is consistent with a first template, which includes a representation of a feature of mature content that corresponds to a first restricted class. In embodiments, the image scanner determines that a first portion of the image is consistent with a representation of a feature contained within the first template when the image scanner determines a difference between the portion of the image and the feature, where the difference is within a predetermined range of magnitude. In another embodiment, a portion of an image can be consistent with a feature template if the portion of the image has a certain number of items in common with the feature. It should be understood that, in various implementations of embodiments of the invention, the image scanner can compare images and feature templates using any number of suitable methods, all of which are considered to be within the ambit of the present invention.

With continued reference to FIG. 10, at step 1018, the image scanner determines that a second portion of the image is consistent with a second template, which corresponds to a second restricted class. At step 1020, a verification module, or the like, determines that the recipient belongs to the first restricted class but not the second. At a final illustrative step 1022, the image is displayed to the recipient where the image includes the second portion but not the first portion. In this manner, portions of images and/or communications can be accessed by individuals that are members of some restricted classes but not others.

Figure 11:
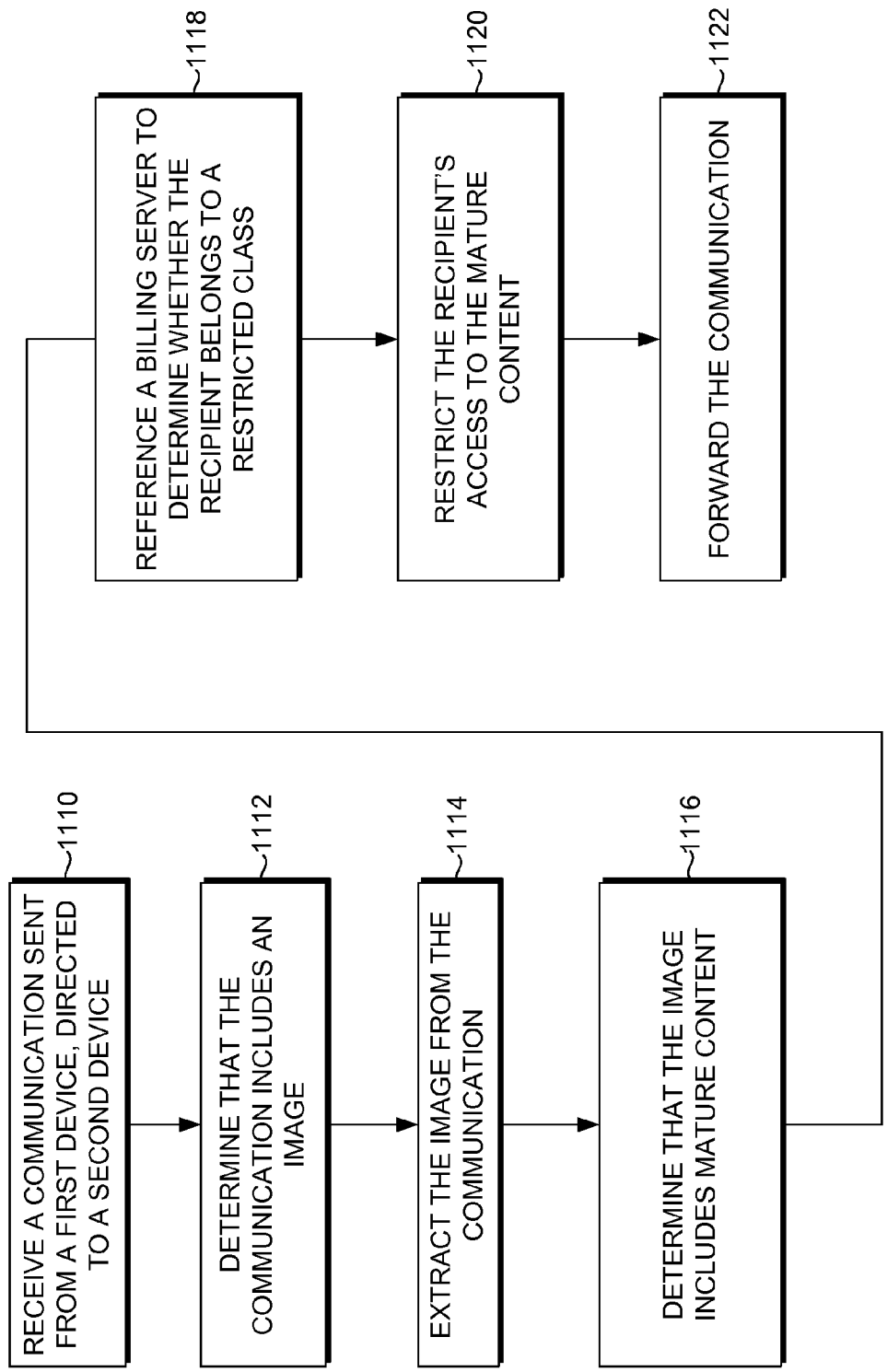
FIG. 11 is a flow diagram depicting an illustrative method of restricting access to mature content in accordance with embodiments of the invention.

Turning now to FIG. 11, a flowchart depicts an illustrative method 1100 of restricting mature content using a content filter deployed on a network element. At a first step 1110, a network element (e.g., a server, a MAG, etc.) receives a communication sent from a first device that is directed to a second device. In embodiments, the communication can be directed to a particular recipient associated with the second device. According to embodiments of the invention, the communication can be any type of communication that can be transmitted over a network such as, for example, an MMS message, an SMS message, e-mail, an instant message, and the like.

At step 1112, the network element determines that the communication includes an image. At step 1114, the network element extracts the image from the communication. In embodiments the network element assembles the image using portions of the image that are included in a number of data packets intercepted by the network element. Accordingly, in some implementations, the network element assembles the image in a temporary buffer or other volatile storage. Various efficiencies can be designed into the network element so that the process of assembling and scanning images does not cause a noticeable delay in network traffic.

At step 1116, an image scanner implemented on the network element scans the image and determines that the image include mature content. At step 1118, the network element references a billing server to determine whether the recipient belongs to a restricted class. In other embodiments, the network element can include an associated database that contains identifications of potential recipients (e.g., network users) and associated demographic information (e.g., age, address, etc.). In some embodiments, the network element can reference a different server, a user device, or the like, to obtain information about the intended recipient. Upon determining that the recipient belongs to a restricted class, as shown at step 1120, the network element restricts the recipient's access to mature content. At a final illustrative step, step 1122, the network element forwards the communication to another network element or to the second device. In other words, the network element, having scanned and, if applicable, filtered the communication, forwards the packets making up the communication to the next hop on its path to the second device, wherever that may be.

Figure 12:
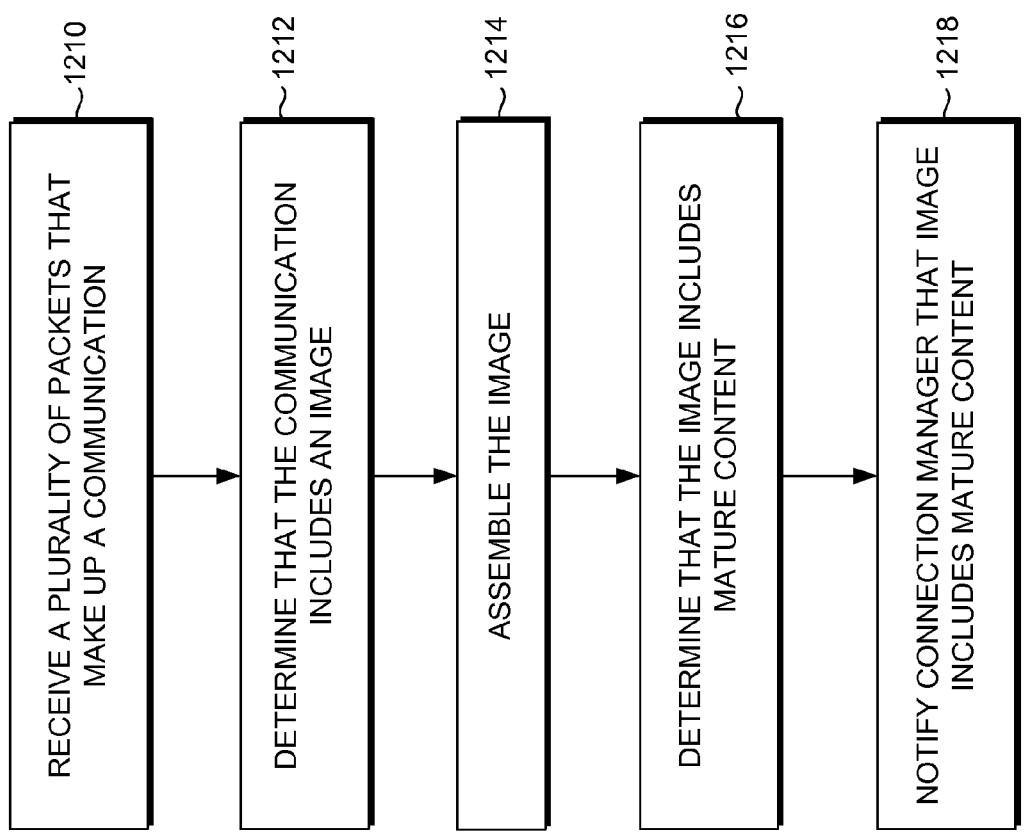
FIG. 12 is a flow diagram depicting an illustrative method of restricting access to mature content in accordance with embodiments of the invention.

Turning now to FIG. 12, a flowchart depicts an illustrative method 1200 of restricting access to mature content included in a communication received at a computer via a data card on which aspects of a content filter are implemented. At a first step, step 1210, the data card receives a plurality of packets that make up a communication. At step 1212, an image detector on the data card determines that the communication includes an image and, as shown at step 1214, a module on the data card assembles the image from portions included in the plurality of packets. In some embodiments, the data card can include a temporary buffer for storing the image as it is being assembled. At step 1216, an image scanner deployed on the data cards scans the image and determines that the image includes mature content. In some embodiments, the data card can include storage that houses feature templates for use in scanning images.

At a final illustrative step, step 1218, the data card notifies a connection manager installed on the associated computing device that the image includes mature content. In embodiments, the data card can remove the image (or the portion of the image that includes mature content) from the communication before forwarding the communication to the computing device. In other embodiments, the connection manager can remove the mature content, remove the image, encrypt the mature content or image, apply an ACL to the mature content or image, or provide alternate content to be rendered at the computing device.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. One or more non-transitory computer-readable media having computer-executable instructions embodied thereon that, when executed, facilitate a method of controlling access to mature content, said mature content comprising content that has been designated as inappropriate for viewing by a designated class of people, the method comprising:
   receiving a communication at a user's device;
   determining that the communication includes an image;
   determining whether the image has been previously flagged as containing mature content;
   when the image has been previously flagged as containing mature content, then restricting access to the mature content;
   when the image has not been previously flagged as containing mature content, then
   A) scanning the communication at the user's device,
   B) determining that the image includes mature content,
   C) based on the determination that the image includes mature content, flagging the image with an indication that the image has been scanned and with an indication that the image includes mature content,
   D) storing the flagged image at the user's device, and
   E) restricting access to the mature content;
   said scanning comprising:
   A) referencing a plurality of feature templates, each feature template comprising a representation of a known feature,
   B) determining that a first portion of the image is consistent with a first feature template, wherein the first feature template corresponds to a first type of mature content, the viewing of which is designated as inappropriate for a first class of people, and
   C) determining that a second portion of the image is consistent with a second feature template, wherein the second feature template corresponds to a second type of mature content, the viewing of which is designated as inappropriate for a second class of people; and
   said restricting access to the mature content comprising:
   A) receiving an access request initiated by a user, wherein the access request includes a request to display the image,
   B) determining that the user belongs to the first class of people and that the user does not belong to the second class of people, and
   C) displaying the image, wherein the displayed image includes the first portion but not the second portion.

2. The media of claim 1, wherein the communication is an email, a short-messaging service (SMS) message, a multimedia messaging service (MMS) message, or an instant message.

3. The media of claim 1, wherein restricting access to the mature content includes requiring a user to input a login credential before allowing the user access to the mature content.

4. The media of claim 1, wherein restricting access to the mature content includes replacing the mature content with alternate content, wherein a user is allowed access to the alternate content.

* * * * *